(12) United States Patent
Malik

(10) Patent No.: US 6,801,610 B1
(45) Date of Patent: Oct. 5, 2004

(54) SYSTEM AND METHOD FOR AUTOMATED CONFERENCE CALL SETUP

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/544,933

(22) Filed: Apr. 7, 2000

(51) Int. Cl.[7] .............................. H04M 3/42; H04M 7/00
(52) U.S. Cl. ............................. 379/202.01; 379/221.08
(58) Field of Search ........................ 379/201.01–207.01

(56) References Cited

U.S. PATENT DOCUMENTS

| | | | | |
|---|---|---|---|---|
| 3,912,874 A | * | 10/1975 | Botterell et al. | 379/205.01 |
| 5,483,588 A | * | 1/1996 | Eaton et al. | 379/202.01 |
| 5,701,301 A | | 12/1997 | Weisser, Jr. | 370/428 |
| 5,953,400 A | * | 9/1999 | Rosenthal et al. | 379/202.01 |
| 6,011,579 A | * | 1/2000 | Newlin | 348/14.08 |
| 6,236,644 B1 | * | 5/2001 | Shuman et al. | 370/261 |
| 6,272,214 B1 | * | 8/2001 | Jonsson | 379/202.01 |
| 6,674,851 B1 | * | 1/2004 | Brush et al. | 379/221.08 |

* cited by examiner

Primary Examiner—Ahmad F. Matar
Assistant Examiner—Hector Agdeppa
(74) Attorney, Agent, or Firm—Woodcock Washburn LLP

(57) ABSTRACT

A method and system are disclosed for establishing a conference call in an advanced intelligent network comprising a service switching point connected to a plurality telephone stations, a service node having an interactive data system, a conference circuit that includes a plurality of ports to selectively couple telephone stations, and a service control point containing a database. The method including receiving, at the storage node, conference call setup information used to initiate conference calls; forwarding the conference call setup information to the service control point for storage in the database, and contacting each participant to the conference call in accordance with the conference call setup information to couple the participants to the conference call. Participants may be contacted at a plurality of telephone numbers until reached, and one or more of the participants may be prompted for help in locating a missing participant. Voice information may be collected from participants in the call, such as prompting the participant for a password.

19 Claims, 2 Drawing Sheets

SYSTEM AND METHOD FOR AUTOMATED CONFERENCE CALL SETUP

FIELD OF THE INVENTION

The present invention generally relates to the field of telecommunications and to an apparatus and method for managing telephony-based services. More particularly, the present invention relates to an intelligent or advanced application, such as an Advanced Intelligent Network (AIN) application, for managing the creation of conference calls within a telephone network.

BACKGROUND OF THE INVENTION

A conventional teleconferencing system requires a conference call originator to manually dial each participant from a Private Branch Exchange (PBX). Each participant is placed on hold until all are connected to the conference originator. The disadvantages of this technique are many, as this method is extremely inconvenient and time-consuming for the call originator. Also, this technique often results in audio quality that becomes increasingly degraded as additional attendees are connected to the call.

An improvement over the above is a conference call service, which is offered by a third party to set up a conference call between multiple parties. Conference call services require an originator to contact a conference call coordinator with the date and time of the call and the telephone numbers (and names) of the participants. At the appropriate time, the conference call coordinator initiates the conference by contacting and connecting the participants. This frees the originator from manually dialing the telephone numbers of the participants, but required another human operator to coordinate the call. Other conference call services allow participants to join a conference call by calling in to an operator and providing an identification number of the call.

In recent years, a number of new telephone service features have been provided by an Advanced Intelligent Network (AIN). The AIN evolved out of a need to increase the capabilities of the telephone network architecture in order to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

While prior teleconferencing systems have provided limited teleconferencing capabilities, they have failed to automate the process such that originators can set up a conference call, without the necessity of contacting third party services. Further, conventional systems do not provide adequate security as conventional systems do not authenticate participants as they receive the conference call. Such features would be highly desirable for conference call originators who require security and ease. The present invention is directed to such a solution.

SUMMARY OF THE PRESENT INVENTION

According to an aspect of the invention, there is provided a system for establishing conference calls within a telephone network. The system includes a service switching point connected to a plurality of telephone stations, a service node having an interactive data system, a conference circuit that includes a plurality of ports to selectively couple telephone stations, and a service control point containing a database. The service node is adapted to receive conference call setup information used to initiate conference calls, and the service node forwards the conference call setup information to the service control point for storage in the database. The service control point contacts each participant to the conference call in accordance with the conference call setup information to couple the participants to the conference call.

In accordance with another aspect of the invention, there is provided a method of establishing a conference call in an advanced intelligent network comprising a service switching point connected to a plurality of telephone stations, a service node having an interactive data system, a conference circuit that includes a plurality of ports to selectively couple telephone stations, and a service control point containing a database. The method includes receiving, at the storage node, conference call setup information used to initiate conference calls, forwarding the conference call setup information to the service control point for storage in the database, and contacting each participant to the conference call in accordance with the conference call setup information to couple the participants to the conference call.

According to yet another aspect of the invention, there is provided a method of establishing a conference call in a telephone network without operator intervention, comprising receiving information regarding a time and date of the conference call, a number of participants, and one or more telephone numbers for each participant; forwarding the received information to a service control point for storage in a database; reserving ports within a conference circuit to couple the participants to the conference call at the time and date of the conference call; and contacting each participant and coupling the participants to the conference circuit.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

According to an aspect of the present invention, an apparatus and method for managing conference call services may be implemented using an AIN or AIN-type network. AIN systems are described in U.S. Pat. No. 5,701,301, which is incorporated herein by reference in its entirety. In particular, an AIN network with at least AIN Release 0.2 and advanced intelligent network capabilities may be utilized to implement the various features and aspects of the invention. It should be noted, however, that the implementation of the present invention is not limited to AIN-based networks, and other advanced or intelligent networks and arrangements may be used to implement the invention.

Figure 1:
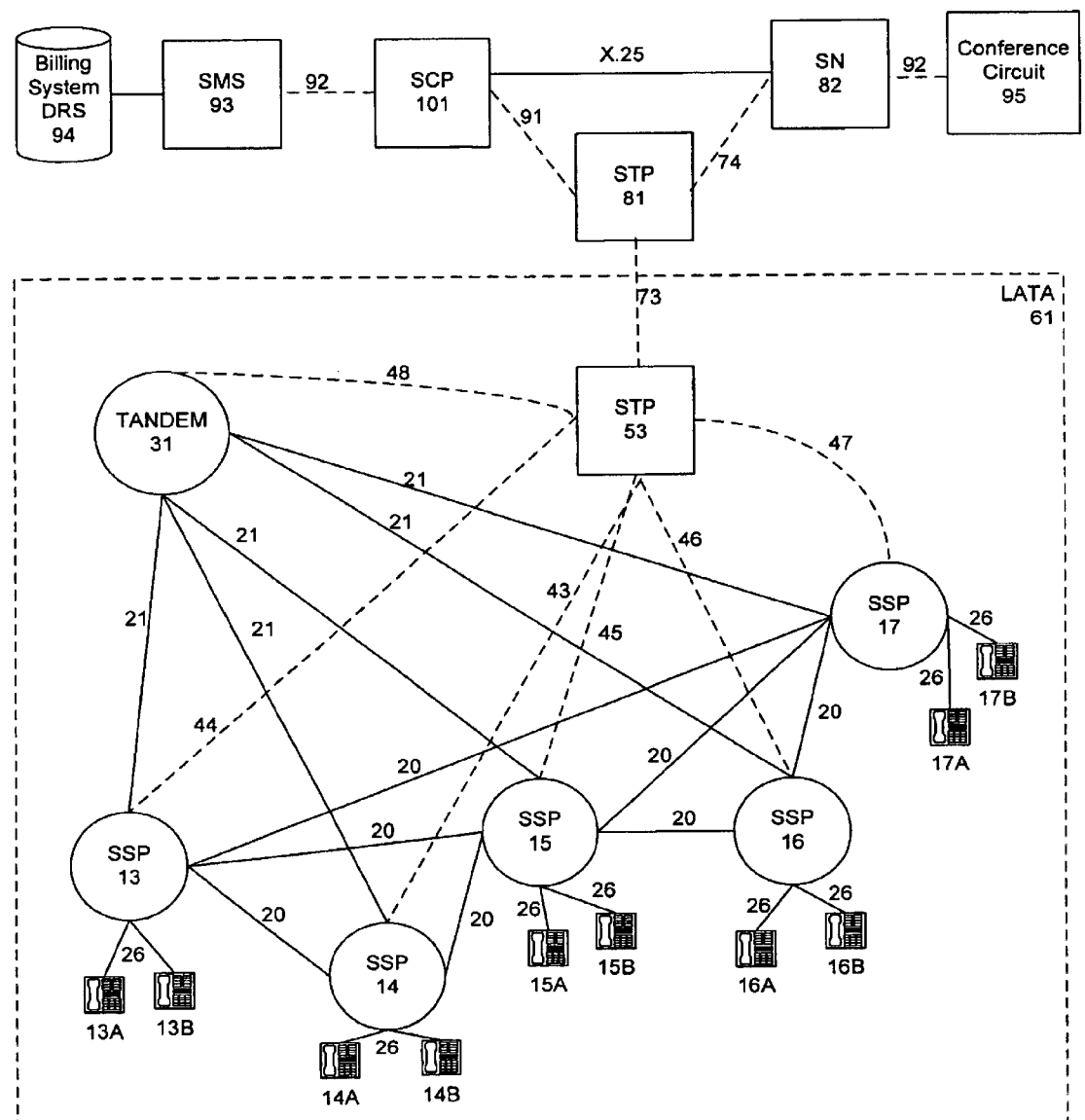
FIG. 1 illustrates, in a general block diagram form, an Advanced Intelligent Network (AIN)-based system for implementing intelligent network management features, in accordance with an embodiment of the present invention.

Referring now to the accompanying drawings, FIG. 1 illustrates an AIN-based network arrangement incorporating the various features of the invention, as further described below. In the embodiment of FIG. 1, a telephone network within LATA 61 is provided that defines a calling service area. The LATA 61 includes stations, e.g., stations 13A, 13B, 14A, 14B, 15A, 15B, 16A, 16B, 17A and 17B, and corresponding switches, e.g., service switching points (SSP) (also known as central offices (CO)) 13, 14, 15, 16 and 17. The COs 13, 14, 15, 16 and 17 may comprise, for example, 1AESS or 5ESS switches manufactured by, for example, Lucent Technologies, Inc., having AIN Release 0.2 capabilities and protocols, or DMS-100 switches manufactured by, for example, Nortel having AIN Release 0.2 capabilities and protocols, or in the case of the 1AESS, additionally having AIN Release 0.0 and AIN Release 0.1 capabilities and protocols. Additionally, it may be possible for the DMS-100 and 5ESS switches to have AIN Release 0.0 and AIN Release 0.1 capabilities and protocols. Further, in accordance with an aspect of the present invention, as new AIN Releases and protocols (e.g., AIN Release 0.3) are introduced, the capabilities of the SSPs and the service logic of the present invention may be upgraded accordingly.

In the example shown in FIG. 1, each switch may include different types of facilities and/or triggers. The SSPs 13–17 are each programmable switches which: recognize AIN-type calls, launch queries to service control point (SCP) 101, and receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

As further shown in FIG. 1, either a direct route or a tandem route may exist between all switches. In LATA 61, direct trunks 20 may exist between SSP 13, SSP 14, SSP 15, SSP 16 and SSP 17. Assuming LATA 61 to be a large service area, direct trunks 20 may not be available between each switch, either due to geographical limitations or due to excessive traffic. For example, SSP 13 may alternatively use tandem trunk 21 to a tandem switch 31 and may use trunk 21 to SSP 17 to terminate an offered call. This alternative path may be an overflow route for traffic that cannot find room on trunk 20 between SSP 13 and SSP 17. The trunks 21 and 22 may be either SS7 controlled multi-frequency trunks (MF), or primary rate interface (PRI) trunks, and the type of trunk will be in accordance with both the sending and receiving SSP to which it is connected. If either of the SSPs is a 1AESS type switch, the trunk will be an SS7 controlled MF type trunk as the 1AESS is not capable of supporting PRI trunks. However, if both the sending and receiving switches are either a DMS-100 switch or a 5ESS switch, the trunk may be either an SS7 controlled MF type trunk or PRI type trunk.

Each office equipped as an AIN SSP may allow normal switch processing to be suspended at specific points in a call so that the switch may send an AIN message query to SCP 101. Alternatively, SCP 101 may comprise an integrated service control point (ISCP). Service control point 101 may execute software based service logic and return call processing instructions to the triggering AIN SSP. New services may be provisioned by assigning AIN SSP triggers to customer lines, trunks, and/or NANP telephone numbers.

As described above, within LATA 61 is a tandem switch 31 that is connected to the SSPs 13–17. The tandem switch 31 is coupled to the SSPs 13–17 of LATA 61 by trunks 21. Trunks 21 may interconnect tandem switch 31 with each SSP within LATA 61 for routing of telephone calls. However, trunks 21 may also be used to connect tandem switch 31 to, e.g., toll calls that terminate on SSPs (not shown) outside LATA 61; and, calls originating outside of LATA 61 but terminating on an SSP within LATA 61.

As noted above, the SCP 101 may comprise an integrated service control point (ISCP). The ISCP is an integrated system which may include a service management system (SMS 93), a data and reports system (DRS 94), a programmable service control point (SCP), and a service creation environment (SCE). The SCE may be provisioned as a terminal implemented to work with SMS to create, modify, and load services into the SCP database. The SCE may comprise, for example, a programming environment (such as the SPACE$^{SM}$) for creating and provisioning services. The SCP may execute software-based service logic and return call routing instructions to the triggering SSPs. The SMS 93 may be provided for administrative purposes to synchronize customer CPR and data on the mated pair of ISCPs that SCP 101 represents. The DRS 94 may be provided for compiling call information to be used for billing and administrative purposes. A service node (SN) 82 is an interactive data system which acts as a switch to transfer calls. The SN may be a Lucent Technologies Star Server FT Model 3200 or Model 3300, although others may be employed without departing from the scope of the invention. The SN 82 provides interactive help, collects voice information from participants in a call, may track calls within a conference circuit 95, and provides notification functions. The conference circuit 95 includes a plurality of ports which are used to connect all parties to a conference call. The conference circuit 95 reserves ports and numbers, as necessary, in order to connect the participants of a particular conference call, as will be described in further detail below.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 43, 44, 45, 46, 47, 48, 73 and 91 between each SSP and tandem switch 31 and the SCP 101. The data messages may be formatted in accordance with the Transaction Capabilities Applications Part (TCAP). Alternatively, ISDN Users Part (ISUP) may be used for signaling purposes between, for example, SSPs 13–17. In such a case, the SSPs may be equipped with the capability to map appropriate data between TCAP and ISUP protocols, and vice versa. The telephone network essentially employs an upper-level software controlled network through the Signaling Transfer Points (STPs) and the SCP (and/or ISCP). The software presides over the hardware to check the call route and the availability of connection prior to hardware connection.

Accordingly, the connections by links 43–48, link 73, and link 91 through STPs 53 and 81 are for signaling purposes and allow the SSPs 13–17 to send and receive messages to and from SCP 101 via the STPs. As shown for example in FIG. 1, a local STP 53 may act as the data messaging control point for LATA 61. That is, all data messages from SSPs within LATA 61 or directed to SSPs within LATA 61 may be transmitted through STP 53. Accordingly, CCS links 43–48 are shown establishing a data link between STP 53 and either the tandem switch 31, SSP 13, SSP 14, SSP 15, SSP 16 or SSP 17. Further, one or more regional STPs may be provided for data messaging with the LATA. In FIG. 1, regional STP 81 is illustrated as receiving and transmitting data messages with LATA 61 by connecting to STP 53 by line 73 and connecting to SCP 101 by link 91.

For purposes of illustration, various features of the present invention will now be described from the standpoint of a switch implementing AIN Release 0.2 protocols, and the CPR provisioned with TAT, 10D or DLN triggers. However, as will be apparent to those of ordinary skill in the art based on the disclosure provided herein, the present invention is not limited to implementation through AN Release 0.2 and maybe designed and provisioned with a network utilizing triggers associated with future AN releases and trigger types.

The present invention provides a system within the AIN or AIN-type environment for creating conference calls having a high level of security while being easy to set up. In accordance with the present invention, conference calls are placed by the AIN telephone network to participants, without the need for operator and/or third party intervention.

Figure 2:
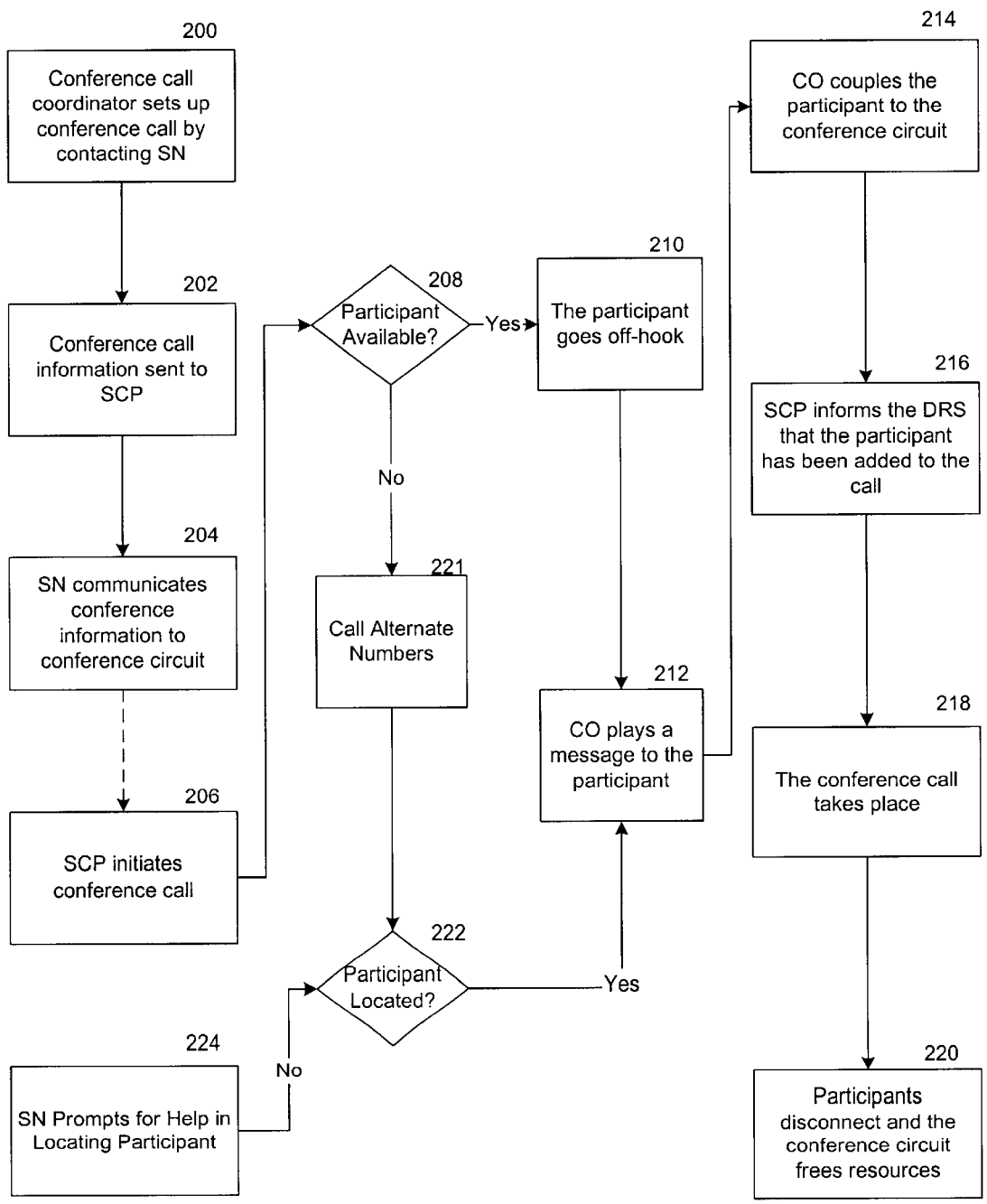
FIG. 2 illustrates an exemplary flow diagram of call processing, according to an aspect of the present invention.

Referring now to the FIG. 2, there is illustrated an exemplary overview of the call flow logic, and an exemplary schematic of a trigger CPR, according to an aspect of the present invention. As noted above, the call flow logic of the present invention is designed to operate with AIN Release 0.2 protocols.

The present invention may be logically separated into two components. The first is the setup of the conference call (steps 200–204). This component enables a conference call originator to set the conference call parameters and billing information. The second component enables the execution of the conference call by contacting the conference call participants (steps 206–224). Call processing begins at step 200, when a conference call coordinator, at e.g., station 17A, sets up a conference call by contacting the SN 82. For example, the coordinator may dial a predetermined telephone number to connect to the SN 82, which triggers AIN processing. After contacting the SN 82, the coordinator may enter conference call setup information such as, a time and date of the conference call, the number of participants, one or more telephone numbers for each participant, a password, and billing information. This information is sent to the SCP 101 at step 202 where it is stored in a database. The service node 82 also communicates the conference information to the conference circuit 95 at step 204, such that ports and numbers are reserved for the conference call at the appropriate time.

The conference call is initiated by the SCP 101, which orchestrates the call by contacting each participant stored in the database (step 206). This may be performed serially (i.e., participant-by-participant) or in parallel (i.e., all participants are contacted at the same time). The AIN Release 0.2 function "CreateCall" is used to achieve this task in step 206. The CreateCall function contacts each participant's CO (e.g., SSP 16, 17 and 18), which in turn, rings the participant's station (e.g., 16A, 17A and 18A). The CreateCall function may utilize the telephone number of the participant, destination number of the participant, and, optionally, provide a termination notification. A distinct ringing pattern may be provided at the destination telephone to signal the call is a conference call. If the participant is available at step 208, the participant goes off-hook at step 210.

If the participant is not available at step 208, the SCP 101 may call an alternate telephone number provided by the originator at step 221. If at step 222 the participant is found, then the participant is added to the conference call, as described below. If, however, the participant is not found at step 222, the SCP 101 will notify the SN 82, which may then prompt one or more of the participants at step 224 for help in locating the missing participant.

At step 212, the CO may then play a message to the participant who answered the call at step 210 or step 222. Alternatively, the participant may be prompted for a password by the SN 82 to authenticate him/herself to the conference call. The password may be set by the call originator in step 200 and provided to participants in advance of the conference call. At step 214 the CO couples the participant to the conference circuit 95. At step 216 the SCP 101 informs the DRS 94 that the participant has been added to the call such that the billing information for the call is updated. In accordance with the present invention, the SCP 101 notifies the SN 82 as participants are added to the conference call. As noted, steps 206–216 and 220–224 may occur in parallel, or repeated for each participant until all participants are connected to the call.

At step 218, the conference call takes place and the SN 82 may disconnect from the call. Optionally, the SN 82 may remain as a participant to provide interactive help and notifications to the participants. For example, a participant may press *C to request help or conference services. It is noted that the key combination *C has been provided as an exemplary key combination to request help or access the SN 82, and other key combinations may be used to access the SN 82. In addition, the SN 82 may notify all or some of the participants that additional participants have been added to the call.

At step 220, some or all of the participants disconnect from the conference call. The conference circuit 95 frees the resources (e.g., ports) held by the now-disconnected participant. If the SN 82 is connected as a participant, the SN 82 may provide notifications to some or all of the remaining participants that participants have disconnect from the call.

In addition, the present invention may provide usage information to originators such as a number of conferences per day/week/month/year, instant billing information, and other information.

As described above, the present invention provides a high security, high reliability system for creating and making conference calls. The system provides high security because the telephone network contacts the participants, rather than having the participants contact an operator. Security is further enhanced by password protecting the conference call. Reliability is enhanced because the system identifies who is or is not present in the call and will, if directed, try to find the missing participant.

It is noted that the written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
CCIS—Common Channel Interoffice Signaling
CCS—Common Channel Signaling
CO—Central Office
CPR—Call Processing Record
CPN—Calling Party Number
DLN—Dialed Line Number
DRS—Data and Reports System
EO—End Office
ISCP—Integrated Service Control Point
ISUP—ISDN Users Part
LATA—Local Access and Transport Area MF—Multi-Frequency
NANP—North American Numbering Plan
NPA—Numbering Plan Area
NXX—Central Office Code
PRI—Primary Rate Interface
PSTN—Public Switched Telephone Network
SCE—Service Creation Environment
SCP—Service Control Point
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for establishing conference calls within a telephone network, comprising:
    a service switching point connected to a plurality telephone stations;
    a service node communicating with the service switching point, the service node comprising an interactive data system;
    a conference circuit that includes a plurality of ports to selectively couple telephone stations during a conference call; and
    a service control point communicating with the service node and the service switching point, the service control point containing a database,
    wherein the service node is adapted to receive conference call setup information used to initiate conference calls, the service node forwarding the conference call setup information to the service control point for storage in the database,
    wherein the service control point contacts each participant to the conference call in accordance with the conference call setup information to couple each of the participants to the conference circuit, and
    wherein if a participant is missing and cannot be coupled to the conference circuit, the service node prompts one or more of the participants to provide a telephone number of the missing participant to the service node the missing participant telephone number being transferred to the service control point to contact the missing participant for coupling.

2. The system as recited in claim 1, wherein a conference call coordinator sets up a conference call by contacting the service node and entering the conference call setup information, and wherein the conference call setup information comprises at least one of a time of the conference call, a date of the conference call, a number of participants, one or more telephone numbers for each participant, a password, and billing information.

3. The system as recited in claim 2, wherein the service node communicates the conference call setup information to the conference circuit to reserve ports and numbers for the conference call.

4. The system as recited in claim 1, wherein a distinct ringing pattern is provided at a destination telephone associated with each of the participants to signal the conference call.

5. The system as recited in claim 1, wherein if a participant is not available at a first telephone number, an alternate telephone number is contacted to couple the participant to the conference circuit.

6. The system as recited in claim 1, wherein the service node provides at least one of interactive help, collection of voice information from participants in the call, tracking of calls within the conference circuit, and providing notification functions.

7. The system as recited in claim 6, wherein the participant is prompted for a password by the service node, and wherein the password is set in advance of the conference call.

8. In an advanced intelligent network comprising a service switching point connected to a plurality telephone stations, a service node having an interactive data system, a conference circuit that includes a plurality of ports to selectively couple telephone stations, and a service control point containing a database, a method of establishing a conference call, comprising:
    receiving, at the service node, conference call setup information used to initiate conference calls;
    forwarding the conference call setup information to the service control point for storage in the database;
    contacting each participant to the conference call in accordance with the conference call setup information to couple the participants to the conference circuit; and
    prompting one or more of the participants to provide a telephone number to the service node for a missing participant that cannot be coupled to the conference circuit, wherein the service node forwards the telephone number to the database,
    wherein the step of contacting each participant is performed by the service control point.

9. The method as recited in claim 8, further comprising:
    contacting the service node; and
    entering the conference call setup information,
    wherein the conference call setup information comprises at least one of a time of the conference call, a date of the conference call, a number of participants, one or more telephone numbers for each participant, a password, and billing information.

10. The method as recited in claim 9, further comprising communicating the conference call setup information to the conference circuit to reserve ports and numbers for the conference call.

11. The method as recited in claim 8, wherein the step of contacting each participant comprises providing a distinct ringing pattern at a destination telephone associated with each of the participants.

12. The method as recited in claim 8, wherein the step of contacting each participant comprises:
    contacting the participant at a first telephone number; and, if a participant is not available at the first telephone number, contacting the participant at an alternate telephone number.

13. The method as recited in claim 8, further comprising collecting voice information from participants in the call;

tracking of calls within the conference circuit; and providing notifications to the participants.

14. The method as recited in claim 13, wherein the step of collecting voice information comprises prompting the participant for a password, and wherein the password is set in advance of the conference call.

15. A method of establishing a conference call in a telephone network without operator intervention, comprising:

receiving information regarding a time and date of the conference call, a number of participants, and one or more telephone numbers for each participant;

forwarding the received information to a service control point for storage in a database;

reserving ports within a conference circuit to couple the participants to the conference call at the time and date of the conference call;

contacting each participant and coupling the participants to the conference circuit; and prompting one or more of the participants for a telephone number to be stored in the database for a missing participant that cannot be coupled to the conference circuit and subsequently calling the telephone number to couple the missing participant to the conference circuit, wherein the step of contacting each participant is performed by a service control point.

16. The method as recited in claim 15, wherein the step of contacting each participant comprises providing a distinct ringing pattern at a destination telephone associated with each of the participants.

17. The method as recited in claim 15, wherein the step of contacting each participant comprises:

contacting the participant at a first telephone number; and, if a participant is not available at the first telephone number, contacting the participant at an alternate telephone number.

18. The method as recited in claim 15, further comprising collecting voice information from participants in the call;

tracking calls within the conference circuit; and providing notifications to the participants.

19. The method as recited in claim 18, wherein the step of collecting voice information comprises prompting the participant for a password, and wherein the password is set in advance of the conference call.

\* \* \* \* \*